United States Patent
Schermeier et al.

(10) Patent No.: US 8,099,044 B2
(45) Date of Patent: Jan. 17, 2012

(54) RADIO FREQUENCY DETECTION SYSTEM FOR A MEDICAL DEVICE AND PROCESS

(75) Inventors: Olaf Schermeier, Lübeck (DE); Markus Steeger, Lübeck (DE)

(73) Assignee: Dräger Medical GmbH, Lübeck (DE)

( * ) Notice: Subject to any disclaimer, the term of this patent is extended or adjusted under 35 U.S.C. 154(b) by 1181 days.

(21) Appl. No.: 11/843,878

(22) Filed: Aug. 23, 2007

(65) Prior Publication Data

US 2008/0064445 A1    Mar. 13, 2008

(30) Foreign Application Priority Data

Sep. 7, 2006 (DE) .......................... 10 2006 041 914

(51) Int. Cl.
*H04B 5/00* (2006.01)
*H04B 7/00* (2006.01)
(52) U.S. Cl. ..................... 455/41.1; 455/41.2; 455/41.3; 455/249.1; 340/10.1; 340/10.2; 340/10.3
(58) Field of Classification Search ................ 455/41.1, 455/41.2, 41.3, 249.1; 340/10
See application file for complete search history.

(56) References Cited

U.S. PATENT DOCUMENTS 6,208,235 B1 * 3/2001 Trontelj ....................... 340/10.1
7,541,930 B2 * 6/2009 Saarisalo et al. ............ 340/572.7
2009/0121835 A1 * 5/2009 Borret et al. ................. 455/41.1

FOREIGN PATENT DOCUMENTS

| DE | 202005013779 U1 | 1/2006 |
| DE | 202005013779 | 3/2006 |
| EP | 0529730 | 3/1993 |

* cited by examiner

*Primary Examiner* — Wen Huang
(74) *Attorney, Agent, or Firm* — McGlew and Tuttle, P.C.

(57) ABSTRACT

A radio frequency detection system is provided that includes at least two radio frequency detection devices, which have an antenna each with a detection range for a radio frequency identification and detect the radio frequency identification information provided in the detection range. The radio frequency detection system is designed to attenuate a detection range of a detecting radio frequency detection device in the detection range of the at least one other radio frequency detection device by means of a compensation member such that the radio frequency identification cannot be detected by the detecting radio frequency detection device in the detection area of the at least one other radio frequency detection device. The compensation member feeds a compensation current to the at least one other antenna to generate an opposing magnetic field, which attenuates or extinguishes the magnetic field of the detecting antenna in the at least one other detection range, by the at least one other antenna in the at least one other detection range.

16 Claims, 2 Drawing Sheets

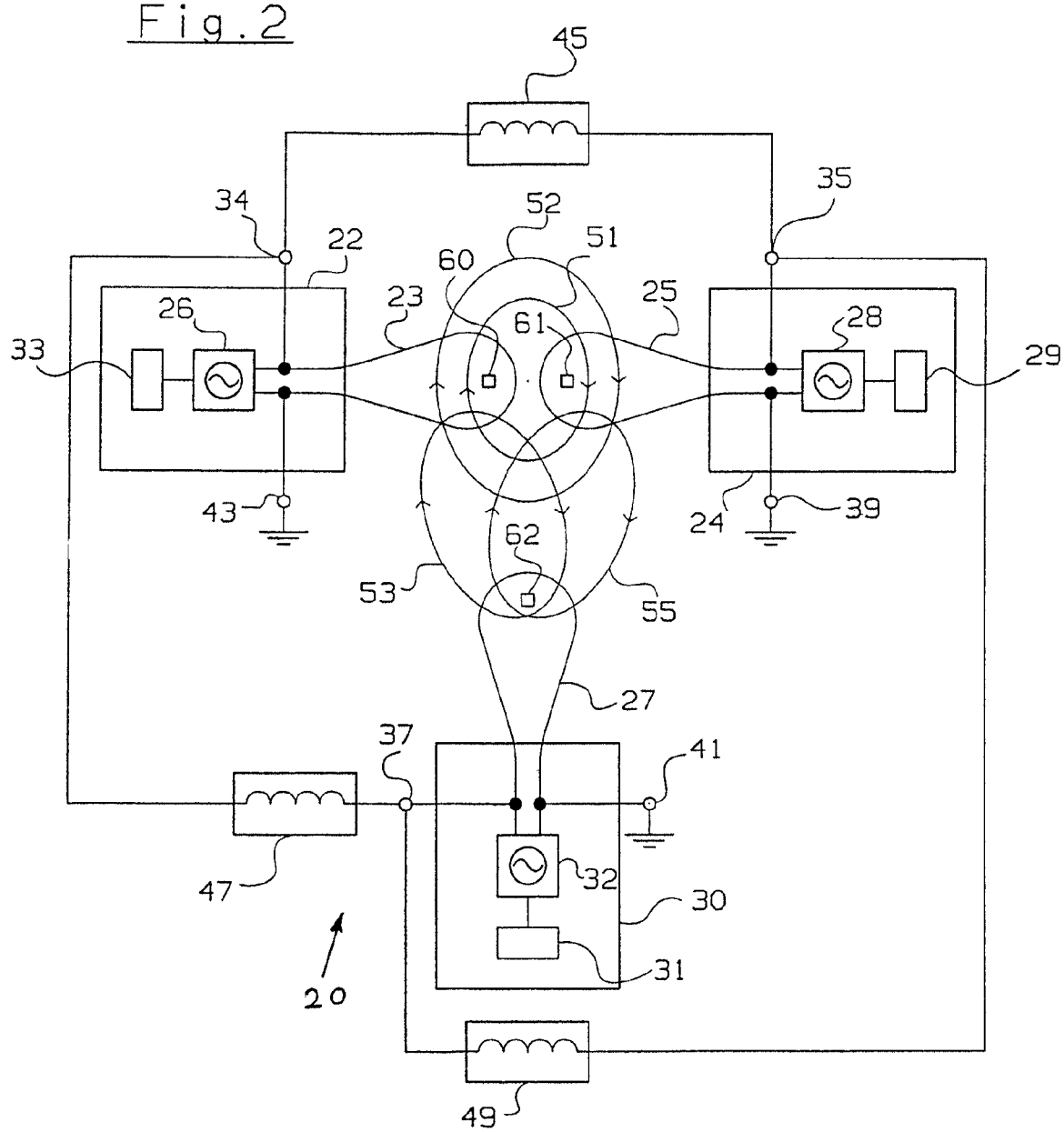

RADIO FREQUENCY DETECTION SYSTEM FOR A MEDICAL DEVICE AND PROCESS

CROSS REFERENCE TO RELATED APPLICATIONS

This application claims the benefit of priority under 35 U.S.C. §119 of German Patent Application DE 10 2006 041 914.6 filed Sep. 7, 2006, the entire contents of which are incorporated herein by reference.

FIELD OF THE INVENTION

The present invention pertains to a radio frequency detection system especially for a medical device with at least two radio frequency detection devices, which have an antenna each with a detection range for a radio frequency identification. The radio frequency detection devices are designed each to detect the radio frequency identification and an identification information made available by these in the detection range.

BACKGROUND OF THE INVENTION

The problem arises in radio frequency detection systems with a plurality of antennas, in which one of the plurality of antennas is assigned to at least one radio frequency detection device, that spatial or local separation of detection ranges of antennas that are adjacent to one another is possible only by providing natural frequencies that are different from one another and consequently by providing frequency channels that are different from one another in the carrier frequency range.

A device for communication with transponders by means of near-field antennas, in which spatial and local separation of detection ranges and hence an unambiguous assignment of detected transponders to an antenna to be detected is achieved by short-circuiting antennas that are adjacent to an antenna that is to be detected, is known from DE 20 2005 013 779 U1. By short-circuiting the adjacent near-field antenna, a magnetic field, which is opposite the field that was generated by the detecting radio frequency detection device by means of the detecting antenna, is generated according to the teaching of DE 20 2005 013 779 U1 according to the Bio-Savart law of induction. According to the teaching of DE 20 2005 013 779 U1, the short-circuiting brings about the delimitation in space of a detection range of a detecting, actively energized near-field antenna. A transponder outside the detection range could possibly still be supplied for communication with a sufficient near-field energy without short-circuiting an adjacent, passive antenna and it could thus interfere with communication in the intended detection range.

SUMMARY OF THE INVENTION

The basic object of the present invention is therefore to provide a radio frequency detection system which makes possible an improved spatial and local limitation of a detection range of a detecting antenna.

This object is accomplished by a radio frequency detection system, especially for a medical device, of the type mentioned in the introduction, wherein the radio frequency detection system is designed to attenuate a detection range of a detecting radio frequency detection device, especially a detection range of the detecting radio frequency detection device. This detection range is expanded or amplified by induction in at least one other detection range, in the detection range of the at least one other radio frequency detection device such that a radio frequency identification cannot be detected by the detecting radio frequency detection device in the detection range of the at least one other radio frequency detection device.

The radio frequency detection system may be designed for this purpose to attenuate or extinguish a magnetic near field forming the detection range of the detecting radio frequency detection device in the detection range of the at least one other detection device. As a result, a radio frequency identification cannot advantageously modulate the magnetic near field and thus it also cannot be detected.

In a preferred embodiment, the radio frequency detection system has a compensation member, which is designed to generate an opposing magnetic field, which attenuates or extinguishes the magnetic field of the detecting antenna in the at least one other detection range, by means of at least one other antenna in the at least one other detection range. As a result, the magnetic near field of the detecting antenna can be advantageously attenuated or extinguished actively. As a result, the radio frequency detection devices can advantageously operate at the natural frequency. Active extinction can take place especially by feeding a compensating current into the at least one other antenna by means of the compensating member. Another advantage over a passive short-circuiting of the other antenna arises from the fact that short-circuiting is associated with losses over an ohmic resistance of the other antenna and an opposing magnetic field generated here is also limited, especially in terms of its field intensity. An actively generated opposing field can be generated at nearly any desired intensity, even beyond a natural detection range of the other antenna. The compensation member is preferably designed for this purpose to feed a compensating current into the at least one other antenna and thus to generate, by means of the at least one other antenna, in the at least one other detection range, an opposing magnetic field that attenuates or extinguishes the magnetic field of the detecting antenna in the at least one other detection range.

Such a compensating member may be designed, for example, to generate a countervoltage with a voltage curve that is in antiphase to a voltage curve of a voltage dropping over the detecting antenna and especially to have a power source for this. The compensation member may advantageously have for this purpose an amplifier, which is connected to the detecting antenna on the input side and to the at least one other antenna on the output side and is designed to generate a compensating current that is in antiphase to the current of the detecting antenna.

As a result, an alternating voltage induced mutually in the at least one other antenna can be advantageously extinguished or attenuated.

In a preferred embodiment, the compensation member has a compensation inductance or is a compensation inductance. Furthermore, first terminals of the antennas of the radio frequency detection systems are preferably connected by means of the compensation member. Furthermore, second terminals of the antennas advantageously have the same potential and are preferably connected to one another electrically. As a result, it is advantageous to form a loop with inductances via which a current suitable for the compensation can be fed into the other antenna.

The compensation member is preferably designed to generate a magnetic flux in the area of the at least one other antenna by means of a compensation current. The generated magnetic flux is opposite the magnetic flux generated by the detecting antenna and thus attenuates or compensates the magnetic field of the detecting antenna.

A magnetic field can be advantageously generated in this manner by means of the at least one other antenna, which magnetic field is directed opposite the detecting magnetic field generated by the detecting antenna and can extinguish or attenuate same at least partially in a local area. Due to the embodiments described above, a radio frequency identification, which is located in the area of the opposing magnetic field generated by the compensation member, cannot advantageously be detected.

In a preferred embodiment, the compensation member is designed to generate a self-induced voltage directed opposite a mutually induced voltage generated by the mutual inductance in the at least one other antenna in such a way that the self-induced voltage and the mutually induced voltage at least partially or completely cancel out each other. As a result, a magnetic field of the detecting antenna can be advantageously extinguished or attenuated.

The compensation member, especially the compensation inductance, is preferably designed such that a voltage curve of a voltage dropping over the compensation inductance and a voltage curve of a voltage dropping over the detecting antenna are equal to each other in terms of value and phase. A voltage dropping over at least one other antenna is advantageously canceled out as a result.

Another embodiment of a radio frequency detection device with a compensation member, which has a compensation capacitance or is a capacitance, is conceivable as well. For example, a parasitic voltage fed parasitically into the antenna can be advantageously compensated hereby.

The present invention also pertains to a process for reducing the size of a detection range in a detection system, wherein a detecting antenna with an active detection range and at least one other antenna with a passive detection range are inductively coupled with one another, especially by crosstalk, and wherein the active detection range is extended into the passive detection range.

The active detection range extended into the passive detection range is preferably attenuated or extinguished in the process, especially actively, such that an identification arranged in the passive detection range, especially a radio frequency identification, cannot be detected by the detecting antenna.

The active detection range is preferably formed by a magnetic field, and is attenuated or extinguished by a magnetic field directed opposite the magnetic field in the area of the passive detection range. Furthermore, the magnetic field directed opposite is preferably generated by a current generated for operating the detecting antenna.

A compensation current, by which a magnetic field at least partially compensating the magnetic near field of the detecting antenna can be generated, can be especially preferably fed through the compensation member into the other antenna.

In a preferred embodiment of the process, a compensation inductance is formed by the detecting antenna and a loop is formed by the at least one other antenna, a loop current being determined by the compensation inductance such that a mutually induced voltage generated by a mutual inductance is canceled out.

As a result, a magnetic field, which can cancel out a magnetic field induced mutually by the detecting antenna, can be self-induced in the at least one other antenna.

The above-described radio frequency detection system and the above-described process have the advantage each that the other radio frequency detection device can also be operated actively, wherein active operation of the other radio frequency detection device is not possible in case of a process in which the other antenna of the other radio frequency detection device is short-circuited. Simultaneous operation of radio frequency detection devices of a radio frequency detection system with mutually adjacent antennas and mutually overlapping detection ranges can be made possible by the compensation member, without losing a spatial resolution due to overlap of the detection ranges.

Another advantage can be seen in the embodiment without switching elements. The use of switching elements, such as relays or transistors, to short-circuit the antenna is absolutely necessary for the variant described in DE 20 2005 013 779 U1. The switching element itself, but also the control lines, the switching electronics and optionally software markedly increase the complexity of the system and the costs of the system. The variant being described here is nearly cost-neutral due to the use of standard components on the antenna circuit.

The present invention also pertains to a medical device with a radio frequency detection system of the type described above. A detection range for a tube connection can be limited especially advantageously in the case of a respirator, which has at least two connections for a breathing tube.

The medical device may be a respirator, an anesthesia apparatus or a breathing monitor.

The medical device may be designed to detect a radio frequency identification in the area of a tube connection. It can thus be advantageously ensured that a breathing tube is connected to the medical device. Furthermore, it can be advantageously ensured that the correct type of tube is connected to the medical device. A breathing tube may have a radio frequency identification in the area of one end for this purpose.

A radio frequency detection device and a radio frequency identification may operate, for example, during the transmission of the identification signals representing an identification information with one of the following modulation methods or with a combination of the following modulation methods:
FM (frequency modulation);
AM (amplitude modulation);
FSK (frequency shift keying);
ASK (amplitude shift keying);
PSK (phase shift keying).

Advantageous frequencies for detecting a radio frequency identification are in the range between 100 kHz and 350 kHz, especially 125 kHz, and in the range between 1 MHZ and 20 MHZ, and especially 13.56 MHZ.

The present invention will be described below on the basis of figures and additional exemplary embodiments. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which the preferred embodiments of the invention are illustrated.

BRIEF DESCRIPTION OF THE DRAWINGS

In the drawings:

FIG. 2 is a diagram showing an exemplary embodiment of a radio frequency detection system with three radio frequency detection devices and three compensation members according to the invention.

DESCRIPTION OF THE PREFERRED EMBODIMENTS

Figure 1:
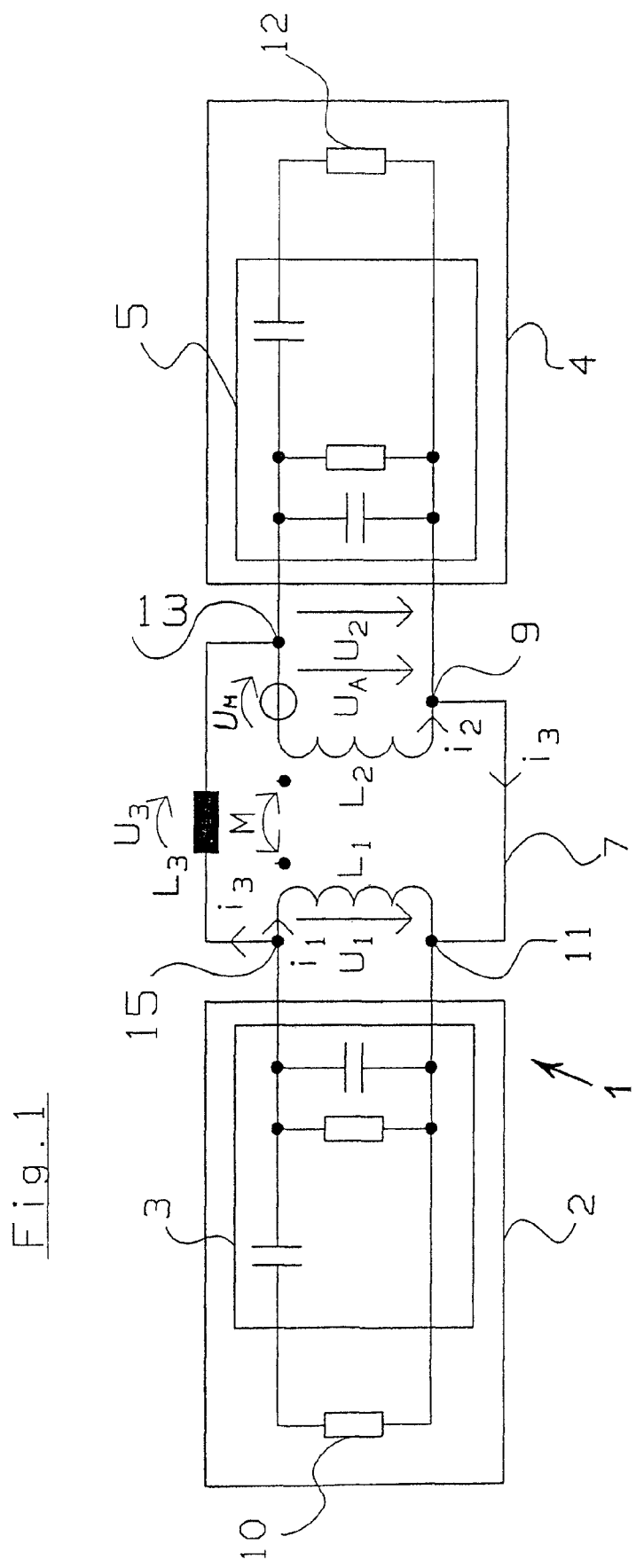
FIG. 1 is a diagram showing an exemplary embodiment of a radio frequency detection system with two radio frequency detection devices and a compensation member according to the invention.

Referring to the drawings in particular, FIG. 1 schematically shows an exemplary embodiment of a radio frequency detection system 1. The radio frequency detection system 1 comprises a radio frequency detection device 2 and a radio frequency detection device 4. The radio frequency detection device 2 has a compensation member 3 and an antenna $L_1$ connected to the compensation member 3. The compensation member 3 is connected on the input side to a transmitter 10 for generating a radio frequency signal with a radio frequency current. The radio frequency detection device 4 has a compensation member 5 and a transmitter 12 for generating a radio frequency signal with a radio frequency current. The compensation member 5 is connected to an antenna $L_2$ on the output side and is connected to the transmitter 12 on the input side.

The radio frequency detection system 1 also has a compensation member $L_3$. The compensation member $L_3$ is designed as an inductance, a first terminal of the compensation member $L_3$ being connected via a connection node 15, especially in the area of a first end of the antenna $L_1$, to the antenna $L_1$. A second terminal of the compensation member $L_3$ is connected to the antenna $L_2$, especially in the area of a first end of the antenna $L_2$. The antennas $L_1$ and $L_2$ are electrically directly connected to one another. The antenna $L_1$ is connected in this exemplary embodiment to the antenna $L_2$ via a connection node 11, a connection line 7 and a connection node 9.

The mode of action of the system 1 will be explained below:

The transmitter 10 is designed to generate a radio frequency signal and to transmit this signal to the antenna $L_1$ via the compensation member 3. A radio frequency current of the radio frequency signal transmitted to the antenna $L_1$ is designated by $i_1$. As a result, a voltage $U_1$ generated by induction drops over the antenna $L_1$. The near field generated by the antenna $L_1$ forms a detection range for a radio frequency identification and flows through the detection range of the antenna $L_2$. The antennas $L_1$ and $L_2$ are now coupled with one another inductively. A mutual inductance M, which characterizes an impedance of the magnetic flux, which couples the antenna $L_1$ and the antenna $L_2$ with one another, is represented as well. The coupling magnetic field flowing through the antenna $L_2$ generates a parasitic voltage $U_M$ that is proportional to the mutual inductance M. When the radio frequency detection devices 2 and 4 are tuned to the same natural frequency via the respective compensation members 3 and 5, a field increase, generated by the parasitic voltage $U_M$, can develop in the detection range of the antenna $L_2$. As a result, a radio frequency identification in the detection range of the antenna $L_2$ can be detected to a greater extent, because lines of flux that extend in the marginal area of the detection range of the antenna $L_1$ without the presence of the antenna $L_2$ are concentrated in the area of the antenna $L_2$ and thus form a locally increased magnetic field intensity.

The radio frequency detection device 2 is designed to detect a transmitting power sent by the transmitter 10, especially by means of a demodulator and thus to detect a change brought about by load modulation of a radio frequency identification in the magnetic near field generated by the antenna $L_1$. A loop, in which a current $i_3$ flows as part of the radio frequency signal sent by the transmitter 10, is formed by means of the antenna $L_1$, the coupling member $L_3$ connected via the connection node 15 and the antenna $L_2$ connected via the connection node 13 and the connection line 7 connected to the antenna $L_1$ via the connection nodes 9 and 11.

The loop current $i_3$ thus formed generates an active induction voltage $U_A$, which has the same direction as the voltage $U_2$ dropping over the antenna $L_2$, in the antenna $L_2$, especially by self-induction. The voltage $U_2$ is thus obtained as the sum of a self-induction voltage, generated by the current $i_2$, a voltage $U_M$ generated by the mutual inductance M as a function of the current $i_1$, and the voltage $U_A$ generated by the induction of the current $i_3$ in the antenna $L_2$. The current $i_3$ generates in the antenna $L_2$ an opposing magnetic field, which extinguishes or attenuates the magnetic near field of the antenna $L_1$ in the detection range of the antenna $L_2$.

According to a loop equation $$-U_1+U_3+U_2=0.$$

the voltage $U_2$ dropping over the antenna $L_2$ is compensated exactly when the voltage $U_1$ dropping over the antenna $L_1$ and the voltage $U_3$ dropping over the compensation inductance $L_3$ have equal values, i.e., the condition $U_1=U_3$ is met. The compensation member $L_3$ meets this condition when its inductance equals $$L_3 = \frac{\sqrt{L_1 \times L_2}}{M}$$

Instead of the mutual inductance M, the coupling factor k can be used, with $$M=k\sqrt{L_1 \times L_2}$$

the compensation member $L_3$ can be described as follows:

$$L_3 = \frac{\sqrt{L_1 \times L_2}}{k}.$$

FIG. 2 shows an exemplary embodiment of a radio frequency detection system 20. The radio frequency detection system 20 has a radio frequency detection device 22, a radio frequency detection device 24, and a radio frequency detection device 30. The radio frequency detection device 22 has an antenna 23, the radio frequency detection device 24 has an antenna 25, and the radio frequency detection device 30 has an antenna 27.

The radio frequency detection device 22 has a transmitter 26, which is connected to the antenna 23 on the output side. The radio frequency detection device 24 has a transmitter 28, which is connected to the antenna 25 on the output side. The radio frequency detection device 30 has a transmitter 32, which is connected to the antenna 27 on the output side. The transmitters 26, 28 and 32 are designed each to generate a radio frequency current.

The antennas 23, 25 and 27 are each designed to generate a correspondingly shaped magnetic near field with a detection range for a radio frequency identification as a function of the radio frequency current flowing through the antenna.

In case of an antenna of a loop-like design, formed, for example, by a ring-shaped wire loop, a detection range is formed, at least in some sections of the loop, corresponding to the shape of a torus, and it encloses the antenna at least in some sections.

A line of flux 51 of the magnetic near field generated by the antenna 23 is shown. A radio frequency identification 60 is arranged in the detection range of the antenna 23. The radio frequency identification 60 is designed for the load modulation of a magnetic near field. Due to the modulation thus generated, the magnetic near field generated by the antenna 23 experiences a flux change, which brings about a reaction to the transmitter 26.

The transmitter 26 is connected to a detection device 33, which has a demodulator. The detection device 33 is designed to detect the load modulation of the magnetic near field, which said load modulation is generated by the radio frequency identification 60, and to generate an identification signal, which corresponds to an identification information represented by the radio frequency identification 60.

A radio frequency identification element 61, which is located in the detection range of the antenna 25, is shown as well. The radio frequency identification element 61 is also located in the detection range of the antenna 23, so that the magnetic near field generated by the antenna 23 could also be modulated by the radio frequency identification element 61. Also shown is a line of flux 52 of the detection range of the antenna 25.

The radio frequency identification element 61 is detected in case of a radio frequency current generated by the transmitter 28, which current flows through the antenna 25. The line of flux 52 also passes through the detection range of the antenna 23, so that the radio frequency identification element 60 arranged in the detection range of the antenna 23 could also be detected by the antenna 25. The transmitter 28 is connected to a detection device 29, which has a design corresponding to that of the detection device 33.

The radio frequency detection device 22 has a terminal 34 for connection to a compensation member, which [terminal] is connected to the transmitter 26 and to a first terminal of the antenna 23. The terminal 34 is connected via a compensation member 45 to a terminal 35 for connecting a compensation member of the radio frequency detection device 24. The terminal 35 is connected to a first terminal of the antenna 25. A second terminal of the antenna 25 is connected to a terminal 39 of the radio frequency detection device 24, the terminal 39 being connected to a common potential of the radio frequency detection system 20. A second terminal of the antenna 23 is connected to a terminal 43 of the radio frequency detection device 22. The terminal 43 is connected to the common potential of the radio frequency detection system 20. The compensation member 45 has an inductance.

A radio frequency current generated by the transmitter 26 can flow in this manner at least partially via the terminal 34, the compensation member 45, the terminal 35, through the antenna 25 and via the terminal 39, further via the common potential and via the terminal 43 to the transmitter 26. The current flowing over the compensation member 45 and the antenna 25 generates an opposing magnetic field in the detection range of the antenna 25, which [field] can attenuate or extinguish the magnetic near field generated by the antenna 23 in the detection range of the antenna 25. The radio frequency identification element 61, which is located in the detection range of the antenna 25, cannot thus be detected by the magnetic near field generated by the antenna 23.

When the transmitter 28 is active and sends a radio frequency current through the antenna 25, a line of flux 52 of the magnetic near field generated by the antenna 25 passes through the detection range of the antenna 23. The radio frequency identification element 60 arranged in the detection range of the antenna 23 could thus also be detected by the magnetic near field of the antenna 25. However, the antenna 23 is connected to the transmitter 28 via the terminal 35 and the compensation member 45 is connected via the terminal 34 and via the common potential via the terminals 39 and 43, so that a radio frequency current generated by the transmitter 28 flows through the antenna 23. An opposing magnetic filed, which attenuates or extinguishes the magnetic near field of the antenna 25 in the area of the detection range of the antenna 23, can be generated in this manner in the detection range of the antenna 23. The radio frequency identification element 60 cannot thus be co-detected by the antenna 25.

The radio frequency detection device 30 has a terminal 37, which is connected to a first terminal of the antenna 27. A second terminal of the antenna 27 is connected to a terminal 41, which is connected to the common potential of the radio frequency detection system 20. The terminal 37 is connected to the terminal 34 by means of a compensation member 47. The terminal 35 is connected to the terminal 37 by means of a compensation member 49.

A radio frequency current generated by the transmitter 26 can flow at least partially via the terminal 34 and via the compensation member 47 and further via the terminal 37 through the antenna 27 and attenuate or extinguish there part of the magnetic near field, which is generated by the antenna 23 and a line of flux 53 of which is shown as an example.

Also shown is a radio frequency identification element 62, which is located in the detection range of the antenna 27. In case of an active antenna 25, a line of flux 55 of the magnetic near field generated by the antenna 25 passes through the detection range of the antenna 27. To compensate the magnetic near field of the antenna 25 in the area of the antenna 27, a radio frequency current generated by the transmitter 28 can send a radio frequency current via the terminal 35, the compensation member 49 and the terminal 37 via the antenna 27 and thus attenuate or extinguish the magnetic near field of the antenna 25 in the area of the antenna 27.

An antenna can act as an active antenna or as a passive antenna in a radio frequency detection system in the above-described manner. An embodiment of a radio frequency detection system in which a plurality of antennas or all antennas are active is also conceivable.

While specific embodiments of the invention have been shown and described in detail to illustrate the application of the principles of the invention, it will be understood that the invention may be embodied otherwise without departing from such principles.

What is claimed is:

1. A radio frequency detection system, comprising:
   a first radio frequency detection device with a first transmitter generating a radio frequency signal and connected to a first device antenna with a first detection range for detecting a radio frequency identification element to detect radio frequency identification information provided in the first detection range;
   a second radio frequency detection device with a second transmitter generating a radio frequency signal and connected to a second device antenna with a second detection range for a radio frequency identification element to detect radio frequency identification information provided in the second detection range;
   a compensation member connected between said first device antenna and said second device antenna for feeding a compensation current from the first device antenna to said second device antenna to generate in the second detection range, by means of said second device antenna, an opposing magnetic field, which attenuates or extinguishes the magnetic field of said first device antenna in the second device detection range, whereby the radio frequency identification element located in the second detection range cannot be detected by said first detection device antenna.

2. A radio frequency detection system in accordance with claim 1, wherein:
  said compensation member has a compensation inductance;
  each of said first device antenna and said second device antenna include a first terminal connected together by means of said compensation member;
  each of said first device antenna and said second device antenna include a second terminal, each at a same potential; and
  whereby said compensation member attenuates or compensates a magnetic flux generated by said first device antenna in the second detection range by the compensation current generating an opposing magnetic flux.

3. A radio frequency detection system in accordance with claim 2, wherein said compensation member generates a self-induced voltage in the second device antenna that is directed opposite a mutually induced voltage generated in the second device antenna such that the self-induced voltage and the mutually induced voltage at least partially cancel out each other.

4. A radio frequency detection system in accordance with claim 1, wherein said compensation member is designed such that a voltage curve of a voltage dropping over said compensation member and of a voltage dropping over said first device antenna and said second device antenna acting as a detecting antenna are equal to each other in terms of value and phase.

5. A radio frequency detection system in accordance with claim 1, wherein said compensation member has a compensation capacitance.

6. A radio frequency detection system in accordance with claim 1, wherein said compensation member generates a counter voltage with a voltage curve that is in anti-phase to a voltage curve of a voltage dropping over the detecting antenna at least one of said first device antenna and said second device antenna acting as a detecting antenna.

7. A radio frequency detection system in accordance with claim 6, wherein said compensation member comprises an amplifier, which is connected to the second device antenna on the input side and to the first device antenna on the output side and generates a compensation current that is an anti-phase to the current of said second device antenna.

8. A process for reducing the size of a detection range in a detection system, the process comprising the steps of:
  providing a first detecting device with a first detecting antenna with a first detection range;
  providing a second detecting device with a second detecting antenna with a second detection range;
  coupling a compensation member between the first detecting antenna and the second detecting antenna; and
  feeding a compensation current from the first detecting antenna to the second detecting antenna via the compensating member for actively attenuating or extinguishing the first detection range extended into the second detection range such that a radio frequency identification element arranged in the second detection range cannot be detected by the first detecting antenna.

9. A process according to claim 8, further comprising:
  arranging a radio frequency identification element in the second detection range or moving a radio frequency identification element into the second detection range whereby the radio frequency identification element cannot be detected by the first detecting antenna when the radio frequency identification element is in a region of the first detection range that is extended into the second detection range.

10. A radio frequency detection system, comprising:
  a radio frequency identification element;
  a first radio frequency detection device with a first device antenna with a first device detection range for detecting identification information of the radio frequency identification element;
  a second radio frequency detection device with a second device antenna with a second device detection range for detecting identification information of the radio frequency identification element;
  a compensation member connected between said first device antenna and said second device antenna, said compensation member for feeding a compensation current from the first device antenna to said second device antenna to generate an opposing magnetic field in the second detection range whereby an opposing magnetic field attenuates or extinguishes the magnetic field of said first device antenna in said second device detection range and for feeding a compensation current from said second device antenna to said first device antenna to generate an opposing magnetic field in the first detection range whereby an opposing magnetic field attenuates or extinguishes the magnetic field of said second device antenna in said first device detection range such that identification information cannot be detected by one radio frequency detection device in the detection range of another radio frequency detection device.

11. A radio frequency detection system in accordance with claim 10, wherein:
  said compensation member has a compensation inductance;
  said first device antenna has a first antenna first terminal;
  said second device antenna has a second antenna first terminal;
  said first antenna first terminal is connected to said second antenna first terminal via said compensation member;
  said first device antenna has a first antenna second terminal at a potential;
  said second device antenna has a second antenna second terminal at said potential; and
  whereby said compensation member attenuates or compensates a magnetic flux generated by at least one of said first device antenna and said second device antenna acting as a detecting antenna in the area of the other of said first device antenna and said second device antenna by a current generating an opposing magnetic flux.

12. A radio frequency detection system in accordance with claim 11, wherein said compensation member generates a self-induced voltage directed opposite a mutually induced voltage generated in the other of said first device antenna and said second device antenna such that the self-induced voltage and the mutually induced voltage at least partially cancel out each other.

13. A radio frequency detection system in accordance with claim 10, wherein said compensation member provides a voltage curve of a voltage dropping over said compensation member and of a voltage dropping over at least one of said first device antenna and said second device antenna acting as a detecting antenna that are equal to each other in terms of value and phase.

14. A radio frequency detection system in accordance with claim 10, wherein said compensation member has a compensation capacitance.

15. A radio frequency detection system in accordance with claim 10, wherein said compensation member generates a counter voltage with a voltage curve that is in anti-phase to a voltage curve of a voltage dropping over the detecting antenna at least one of said first device antenna and said second device antenna acting as a detecting antenna.

16. A radio frequency detection system in accordance with claim 15, wherein said compensation member comprises an amplifier, which is connected to the detecting antenna on the input side and to at least one other antenna on the output side and generates a compensation current that is in anti-phase to the current of at least one of said first device antenna and said second device antenna acting as a detecting antenna.

* * * * *